United States Patent
Ehrenleitner

(10) Patent No.: US 6,991,064 B2
(45) Date of Patent: Jan. 31, 2006

(54) MOBILE LIFTING DEVICE

(75) Inventor: Franz Ehrenleitner, Altensteig-Walddorf (DE)

(73) Assignee: Eisenmann Maschinenbau. KG (Komplementär-Elsenmann-Stiftung, Böblingen (DE)

( * ) Notice: Subject to any disclaimer, the term of this patent is extended or adjusted under 35 U.S.C. 154(b) by 0 days.

(21) Appl. No.: 10/729,877

(22) Filed: Dec. 5, 2003

(65) Prior Publication Data
US 2005/0025612 A1 Feb. 3, 2005

(30) Foreign Application Priority Data
Dec. 5, 2002 (DE) ................ 102 57 108

(51) Int. Cl.
E04G 1/18 (2006.01)
B66D 1/26 (2006.01)

(52) U.S. Cl. ................ 182/141; 254/278

(58) Field of Classification Search ........ 182/141, 182/142, 143, 144, 150; 254/278, 290, 264, 254/266; 187/213, 279, 277, 239, 253, 270; 414/227, 234, 800; 451/354, 439; 125/13.01, 125/21, 12
See application file for complete search history.

(56) References Cited

U.S. PATENT DOCUMENTS

| | | | | |
|---|---|---|---|---|
| 9,790 A | * | 6/1853 | Winkless | 101/17 |
| 1,348,138 A | * | 7/1920 | Hunt | 182/141 |
| 1,938,658 A | * | 12/1933 | Harnischfeger | 414/260 |
| 3,341,034 A | * | 9/1967 | Blasen | 414/141.3 |
| 4,015,685 A | * | 4/1977 | Lenz | 182/142 |
| 4,440,262 A | * | 4/1984 | Hunt et al. | 182/142 |
| 4,552,491 A | * | 11/1985 | Parker | 407/107 |
| 5,199,843 A | * | 4/1993 | Sferra | 414/592 |
| 5,205,379 A | * | 4/1993 | Pfleger | 182/141 |
| 5,335,755 A | * | 8/1994 | Miller | 414/249 |
| 6,106,210 A | * | 8/2000 | Toxer | 414/234 |
| 6,318,503 B1 | * | 11/2001 | Hernandez | 182/144 |

FOREIGN PATENT DOCUMENTS

| | | |
|---|---|---|
| DE | 19819993 | 5/1998 |
| EP | 0963904 A1 | 6/1998 |
| EP | 1106563 | 11/2000 |
| EP | 1378480 | 7/2002 |
| EP | 1340709 | 11/2002 |

\* cited by examiner

Primary Examiner—Hugh B. Thompson, II
(74) Attorney, Agent, or Firm—Watson IP Group, PLC; Jovan N. Jovanovic

(57) ABSTRACT

A mobile lifting device comprises a supporting carriage which is capable of travelling along a specific path and from which there is suspended, via a hoisting apparatus having at least two traction members a lifting platform which can be moved with a vertical component of direction in relation to the supporting carriage. In order to prevent uncontrolled lateral movements of the lifting platform, a stabilizing apparatus is provided which is formed by at least one essentially rigid pivoting member. The latter is swivellably connected, in one end region, to the supporting carriage and, in an opposed end region, to the lifting platform. In this way, a movement of the platform that possesses a vertical component of direction is always linked with a defined horizontal movement. If desired, this defined horizontal movement can be compensated for, wholly or partially, by a corresponding, oppositely directed translational movement of the supporting carriage.

8 Claims, 11 Drawing Sheets

MOBILE LIFTING DEVICE

BACKGROUND OF THE INVENTION

1. Field of the Invention

The invention relates in general to mobile lifting devices, and more particularly, to a mobile lifting device having: (a) a supporting carriage which is capable of travelling along a specific path; (b) a lifting platform for receiving a load; (c) a hoisting apparatus which has at least two traction means and with the aid of which the lifting platform can be moved with a vertical component of direction in relation to the supporting carriage; (d) a stabilising apparatus which prevents an uncontrolled lateral movement of the lifting platform in relation to the supporting carriage.

2. Background Art

Lifting devices of this kind are used in the most varied technical fields. They are particularly often to be found in enamelling installations in which the objects to be enamelled have to be immersed in treatment tanks, or for instance in the shell assembly or final assembly of vehicle bodies. However, they may also be used, for example, as storage and retrieval units for high-bay warehouses. What is common to all these applications is that the objects have to execute both a translatory (horizontal) movement and also a vertical movement.

From the construction point of view, the simplest way of raising or lowering a lifting platform consists in suspending the latter from a number of cables or chains, generally four, and varying the effective length of the cables or chains by winding them onto or off driven drums in the appropriate manner. At this point, however, the problem arises that the lifting platform may execute uncontrolled lateral movements when acted upon by external lateral forces as well as by lateral forces of inertia, and may start to swing, particularly in the lateral direction. In this connection, the term "lateral" is understood to mean any direction that deviates from the vertical, whether it be in the direction of movement of the lifting device or perpendicular to said direction. In known mobile lifting devices of the kind initially mentioned, therefore, stabilising apparatuses are provided which are intended to eliminate lateral movements of this kind.

There are known from the market, for example, mobile lifting devices in which the stabilising apparatus is formed by scissor-type lattices which are attached to the supporting carriage at the top and to the lifting platform at the bottom. These scissor-type lattices ensure that the lifting platform hanging from the cables or chains possesses no lateral degrees of freedom of movement.

In the case of the lifting device described in EP 1 106 563 A2, which likewise belongs to the kind initially mentioned, stabilisation of the lifting platform against unwanted lateral movements takes place as a result of special guidance of the cables or chains between the supporting carriage and the lifting platform.

Both the abovementioned examples of mobile lifting stations possess a relatively expensive construction.

The object of the present invention is to configure a mobile lifting device of the initially mentioned kind in such a way that the expenditure on construction is reduced.

SUMMARY OF THE INVENTION

This object is achieved, according to the invention, through the fact that: (e) the stabilising apparatus is formed by at least one, essentially rigid pivoting member which is swivellably connected, in one end region, to the supporting carriage and, in an opposed end region, to the lifting platform in such a way that, when the supporting carriage is stationary, a movement of the platform that possesses a vertical component of direction is always linked with a defined horizontal movement.

The present invention constitutes, for the first time, a departure from a basic concept in which the prior art was always rooted. According to said concept, attempts were hitherto always made to move the load as precisely as possible in the vertical direction in relation to the supporting carriage and to permit no lateral deflections of any kind. The consequence of this basic constructional concept was the relatively complicated design of the stabilising apparatus.

The invention recognises that it is entirely possible, in most cases, to link a vertical movement of the load with a horizontal movement, as long as the horizontal movement is precisely defined and controlled. This knowledge opens the way for the invention to use, as the stabilising apparatus, one or more simple, rigid pivoting members which is or are swivellably fastened, on the one hand, to the supporting carriage and, on the other, to the lifting platform. In the event of a lifting or lowering movement of the lifting platform, the fastening point of each pivoting member on the lifting platform moves over a circle. This means that, even when the supporting carriage is not moved, each vertical movement of the load is automatically linked with a well-defined horizontal movement, since the distance between the two fastening points of each pivoting member in the horizontal direction, that is to say the projection of the length of the pivoting member onto the horizontal, varies proportionally to the cosine of the angle of pivoting. However, controlled horizontal movements of this kind can be tolerated in almost all cases, since they can be included in advance when calculating the movement of the supporting carriage. As a constructional element, a pivoting member is extremely robust and inexpensive.

The lifting platform may have an essentially rectangular base frame, to which two traction means in each case are fastened on opposite, parallel sides of the rectangle. This type of suspension permits a particularly favourable load distribution over the various cables or chains; it is inherently characterised by particular stability.

There are expediently fastened to the base frame a number of downwardly extending retaining struts to which the load can be detachably fastened. The centre of gravity of the lifting platform is therefore located, particularly when the load is put on, distinctly below that point on the lifting platform to which the traction means and also the pivoting member are fastened.

In a particularly preferred form of embodiment of the invention, a control system is provided, to which a signal which is representative of the vertical position of the lifting platform is fed and which moves the supporting carriage horizontally, in accordance with this signal, in such a way that the horizontal movement which is linked with the vertical movement of the lifting platform is, at least partially, compensated for. With the aid of this configuration, a precise vertical movement of the load in space is possible, since the sidewards movement of the load in relation to the supporting carriage, which movement is linked with the swivelling of the pivoting member or members, is offset by a corresponding translatory movement of said supporting carriage.

The lifting device is particularly flexible if it has its own drive. Generally speaking, in industrial installations in which lifting devices of the kind which are of interest here are used, a number of lifting devices of this kind are conveyed through the installation, one behind the other, on essentially the same path. If each lifting device of this kind possesses its own drive, each supporting carriage can also perform, independently of other supporting carriages, that compensating movement which is necessary for achieving a precise vertical movement of the load located on the lifting device in question. This also means, in particular, that the distance between the supporting carriages of the individual lifting devices can vary.

That configuration in which the supporting carriage of each lifting device is provided with coupling means by which it can be coupled to an external conveyer system, is more economical and, in many cases, also adequate. An external conveyer system of this kind may, for example, be a conveyer chain which extends along the path of movement of the lifting devices. The supporting carriages of the individual lifting devices may be in permanent engagement with the conveyer chain, so that their distance from one another cannot be varied. However, it is also conceivably possible for the external conveyer system to be an overhead twin-rail chain conveyer, into which the supporting carriages of the individual lifting device can be coupled, or from which they can be uncoupled again, as required.

The traction means are preferably cables or chains.

BRIEF DESCRIPTION OF THE DRAWINGS

An exemplified embodiment of the invention will be described in greater detail below with the aid of the drawings, in which.

DETAILED DESCRIPTION OF THE DRAWINGS

Figure 1:
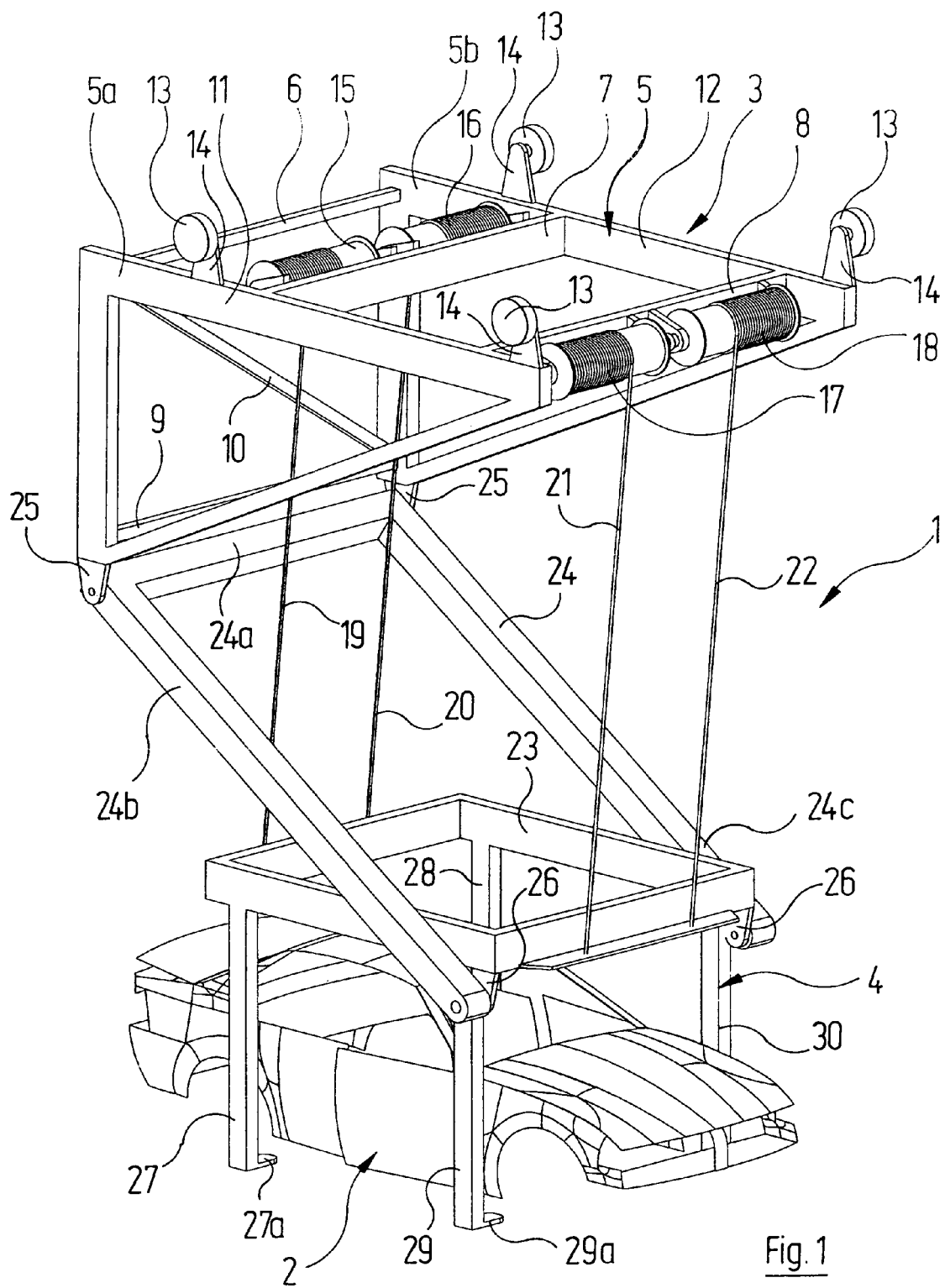
FIG. 1 shows a perspective view of the lifting device, with the lifting platform lowered into its bottommost position and orientated horizontally.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

Figure 2:
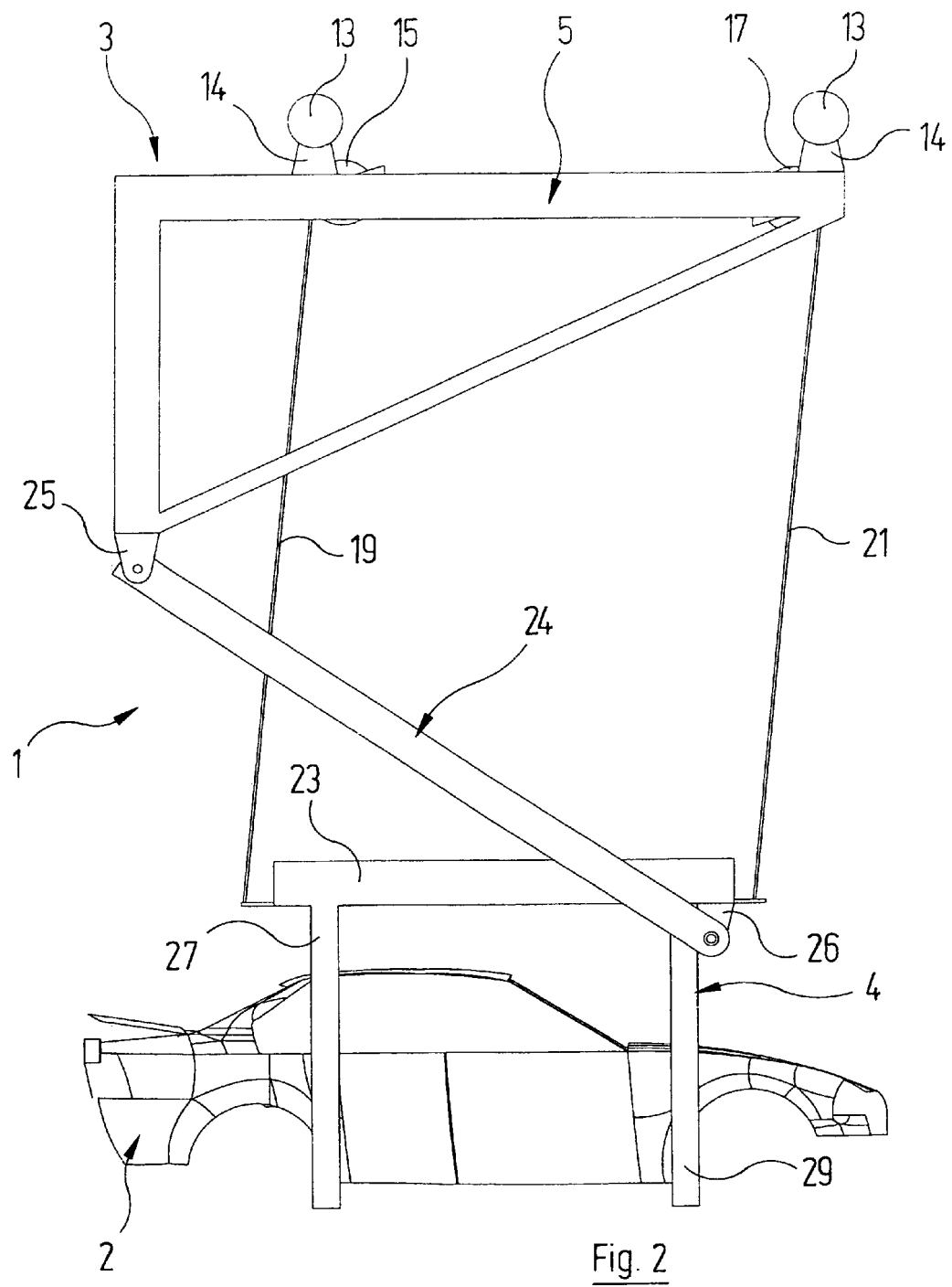
FIG. 2 shows the side view to FIG. 1.

Reference will first of all be made to FIGS. 1 and 2. These show a lifting device which is provided, as a whole, with the reference numeral 1 and which serves to convey vehicle bodies 2 through various treatment stations, for example, through the pretreatment tanks of an enamelling installation and subsequently through a cataphoretic dip-enamelling tank. The lifting device 1 comprises, as the main components, a supporting carriage 3 and also a lifting platform 4 which is held in a vertically adjustable position by the supporting carriage 3 in a manner which will be described further on, and is conveyed together with said carriage.

The supporting carriage 3 possesses a frame 5 which is stiff against torsion and consists of two triangular lateral frame parts 5a, 5b and transverse struts 6, 7, 8, 9 that connect the latter to one another, and of a stiffening strut 10 that passes diagonally through the vertical rectangular side of the frame 5. Disposed on each of the two parallel, horizontal, upper longitudinal traverses 11, 12 of the two lateral parts 5a, 5b of the frame 5 are two driven supporting rollers 13, in each case, which are rotatably mounted in supporting brackets 14 fastened to said longitudinal traverses 11, 12. For the sake of clarity, the motors with the aid of which the supporting rollers 13 can be moved in rotation are not represented.

The supporting rollers 13 disposed on opposite sides of the frame 5 each run in a pair of guide rails, not represented, so that the supporting carriage 3 is able to move along the supporting rails in known manner as a result of rotation of the supporting rollers 13.

Rotatably mounted on that lateral face of the transverse strut 7 of the frame 5 which faces away from the observer in FIG. 1 are two driven cable drums 15, 16. Two other driven cable drums 17, 18 are rotatably mounted, in a corresponding manner, on that lateral face of the transverse strut 8 which points forwards in FIG. 1. The driving motors of the cable drums 15 to 18 are not represented, again for reasons of clarity.

Four cables 19, 20, 21 and 22, whose upper regions are wound onto the cable drums 15, 16, 17, 18, extend from said cable drums 15, 16, 17, 18 to a rectangular base frame 23 of the lifting platform 4, that it to say, to the opposite sides of said frame that extend transversely to the direction of movement. They are fastened at that point.

The supporting carriage 3 is also connected to the lifting platform 4 via a rigid, U-shaped pivoting member 24 which serves, in a manner that will be described further on, as a stabilising apparatus. At an end adjacent to its base 24a, the pivoting member 24 is pivotably mounted in retaining brackets 25 which are fastened to the two lateral parts 5a, 5b of the frame 5 of the supporting carriage 3. This being the case, the base 24a of the pivoting member 24 extends parallel to the transverse strut 9 of the frame 5 and adjacent to said strut.

The two parallel legs 24b, 24c of the pivoting member 24 lie in vertical planes that are orientated parallel to the direction of travel. Their ends which are remote from the base 24a are rotatably mounted in retaining brackets 26 which are fastened in the vicinity of that side of the rectangle of the base frame 23 which faces away from the base 24a and extends transversely to the direction of travel.

Extending downwards from the base frame 23 of the lifting platform 4 are four retaining struts 27, 28, 29, 30, which have, at their bottom end, an angled portion 27a, 28a, 29a, 30a, which angled portions point inwards, that is to say towards one another. The vehicle body 2 is mounted and fastened on the angled portions 27a, 28a, 29a, 30a in a known manner which is not represented.

The functioning of the lifting device 1 described above is as follows:

Let consideration be given, first of all, to FIGS. 1 and 2, in which the base frame 23 of the lifting platform 4 is located in a bottom, lowered position, but at the same time is orientated horizontally. All the cables 19, 20, 21, 22 therefore have the same length between their fastening point on the base frame 23 of the lifting platform 4 and the associated cable drums 15, 16, 17, 18. However, the cables 19, 20, 21, 22 do not extend vertically, since the pivoting member 24 pulls the lifting platform 4 slightly towards the left in FIGS. 1 and 2. The location of the lifting platform 4 is completely stable; no instances of lateral tilting of any kind are possible, either in the direction of movement or perpendicularly to the latter.

Figure 3:
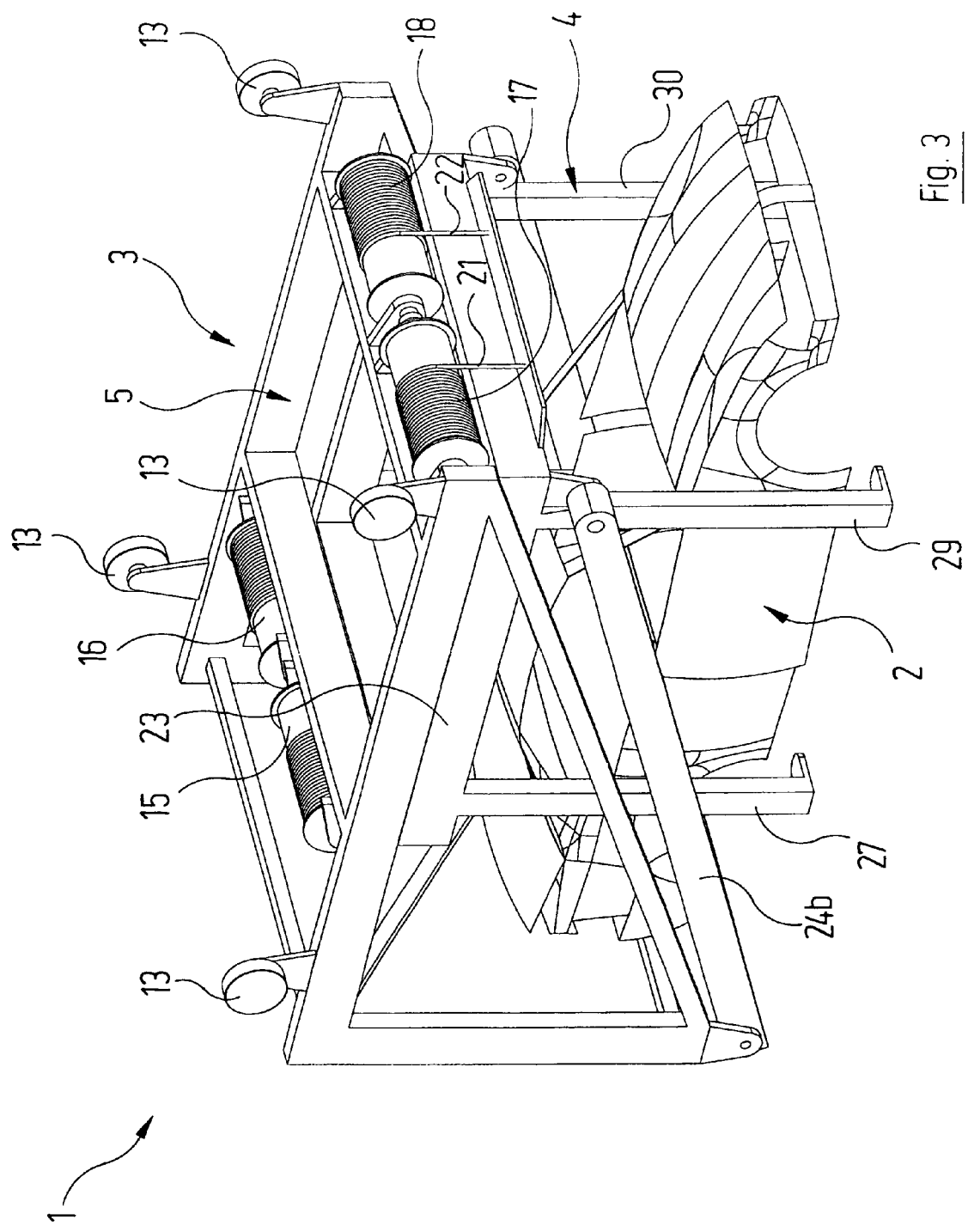
FIG. 3 shows the lifting device in FIG. 1, but with the horizontally orientated lifting platform in the uppermost position.
Figure 4:
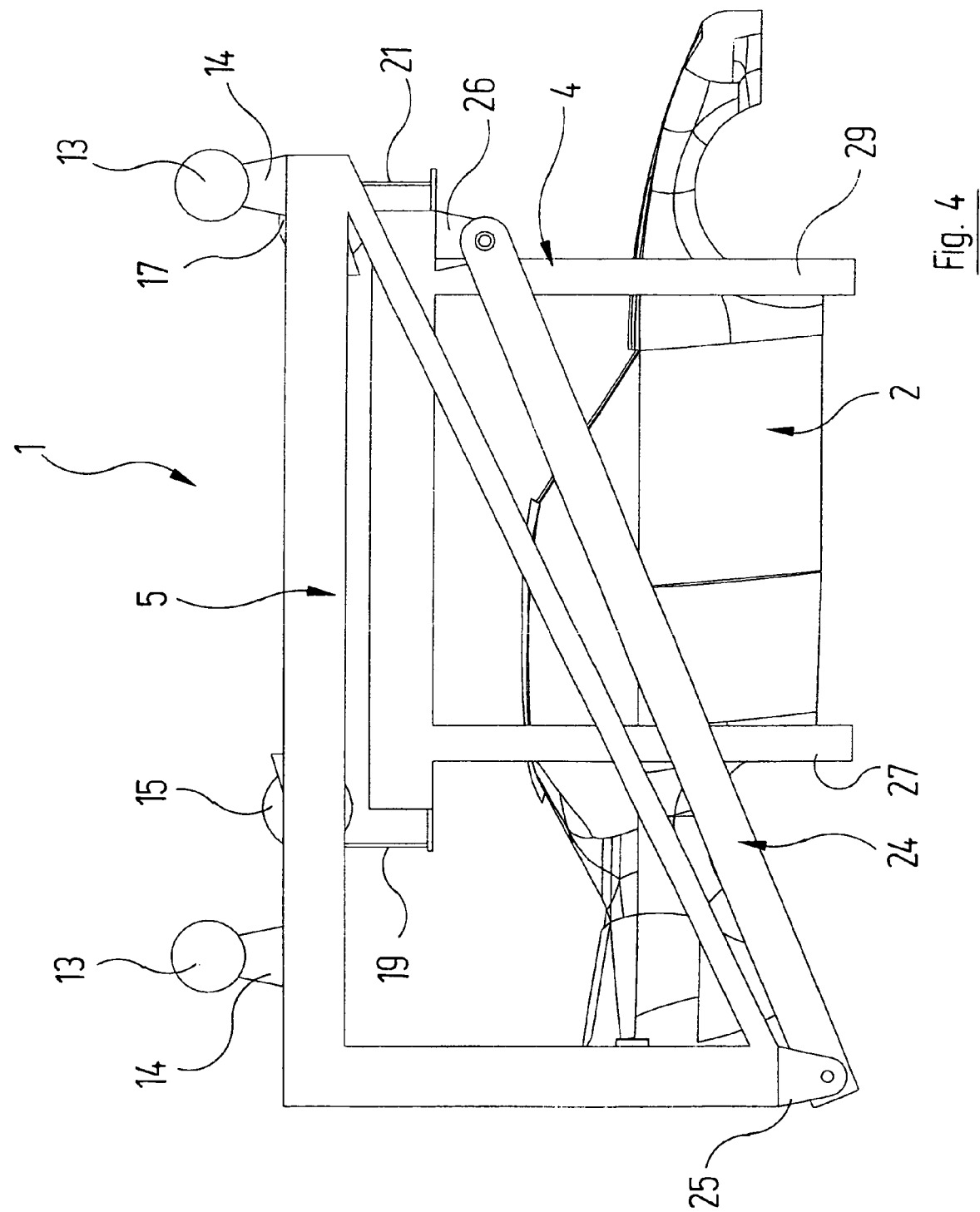
FIG. 4 shows the side view to FIG. 3.

Let it now be assumed that the lifting platform 4 is to be raised out of the position represented in FIGS. 1 and 2 and into the position represented in FIGS. 3 and 4, which represents its normal position in which it is moved, outside the processing stations, with the aid of the supporting carriage 3. This position is brought about by a uniform actuation of all the cable drums 15, 16, 17, 18, in which all the cables 19, 20, 21, 22 are shortened to the same extent. The two legs 24b, 24a have now come closer to the obliquely extending struts of the two lateral parts 5a, 5b of the frame 5 of the supporting carriage 3 and extend almost parallel to said struts. Since the angle of pivoting of the pivoting member 24 in relation to the horizontal in FIGS. 3 and 4 is smaller than in the lowered position in FIGS. 1 and 2, the supporting cables 19, 20, 21, 22 now extend vertically.

Figure 5:
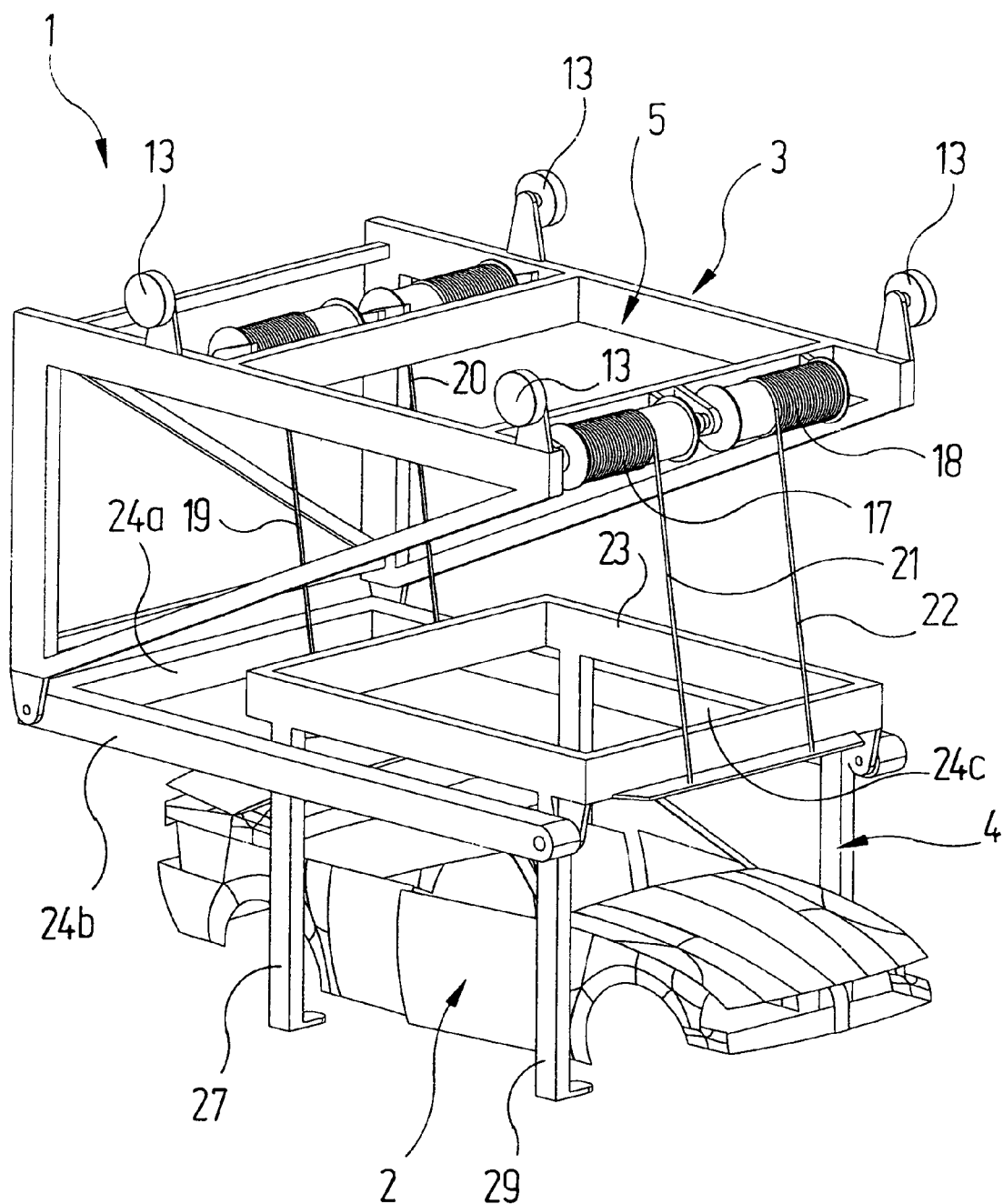
FIG. 5 shows the lifting device in FIGS. 1 and 3, but with the horizontally orientated lifting platform in a middle position.
Figure 6:
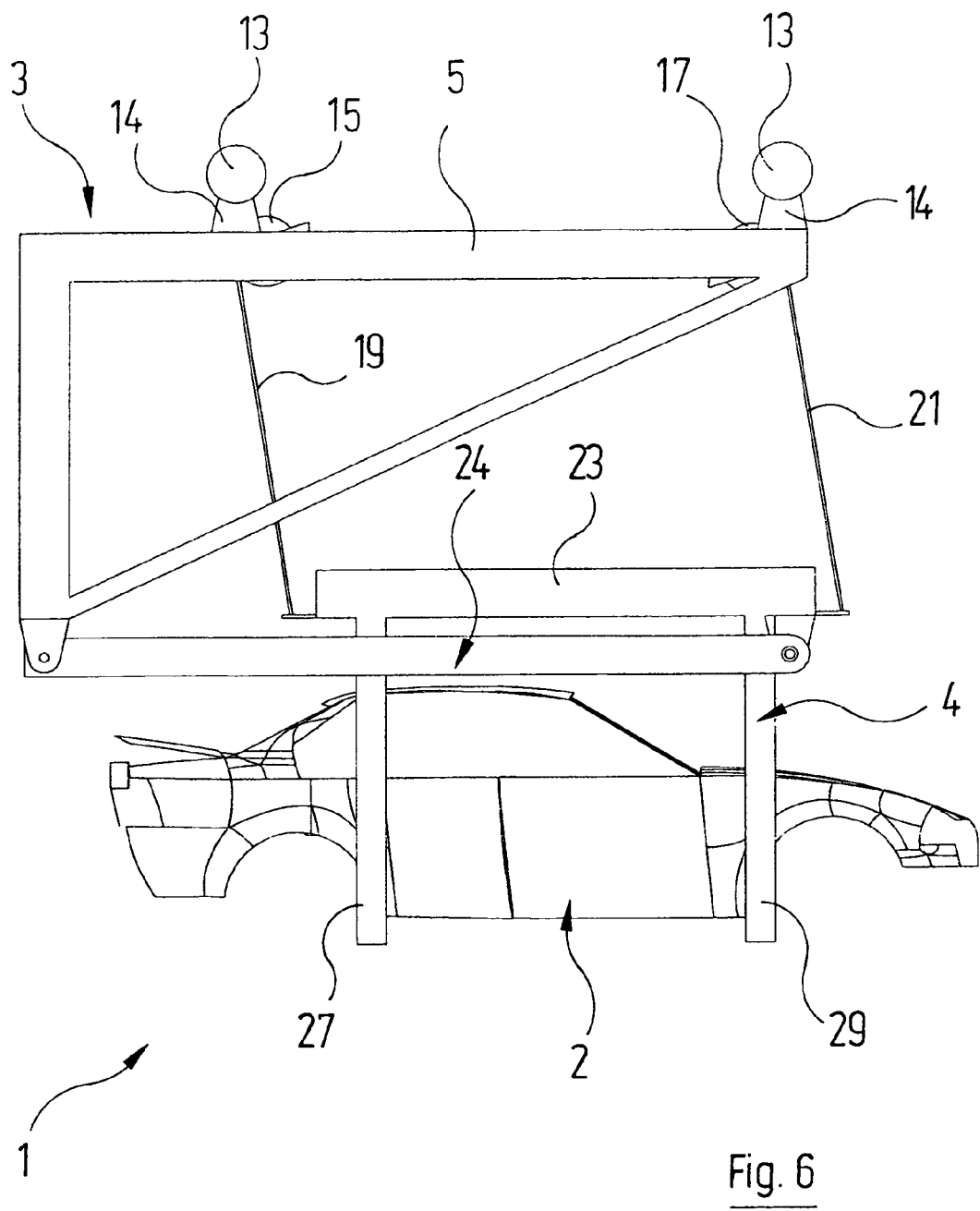
FIG. 6 shows the side view to FIG. 5.
Figure 7:
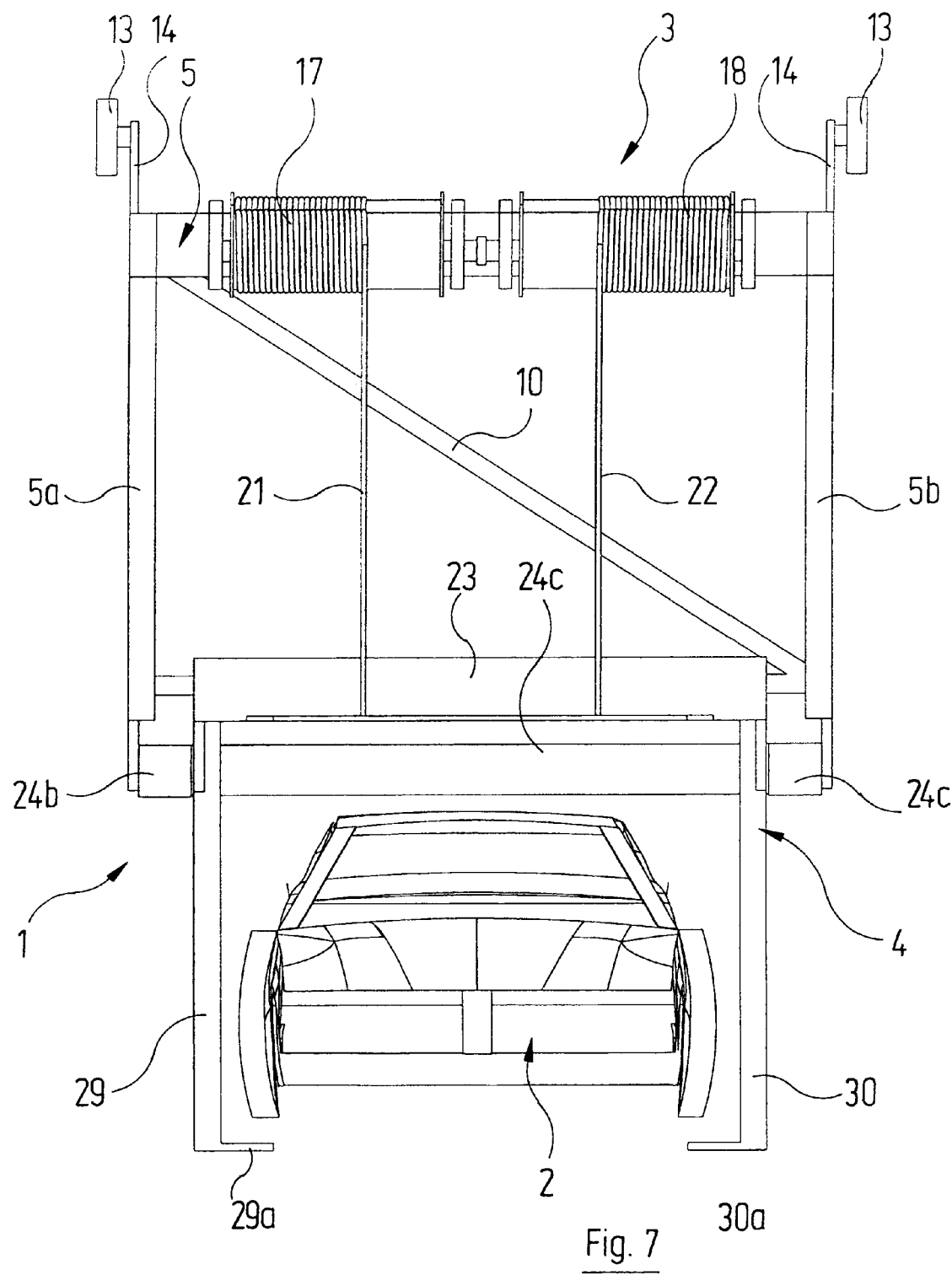
FIG. 7 shows the front view to FIG. 5.

On the way from the position presented in FIGS. 1 and 2 into the position in FIGS. 3 and 4, the lifting platform 4 passes through the position represented in FIGS. 5 and 6, in which the pivoting member 24 is horizontal. In this position, the lifting platform 4 is at the greatest distance, in the horizontal direction, from the vertical rectangular side of the frame 5 of the supporting carriage 3. The cables 19, 20, 21, 22 therefore again form an angle with the vertical, but this time in the opposite direction, in relation to the vertical, to that in FIGS. 1 and 2.

Consideration of FIGS. 1 to 7 makes it clear that, even when the supporting carriage 3 is stationary, a lifting movement of the lifting platform 4 is bound up with a translational movement of said lifting platform 4 in the horizontal direction. In many cases, in which the position of the vehicle body 2 does not need to be accurately defined in the horizontal direction, this does not cause any harm. But in those cases where accurate positioning of the vehicle body 2 is important, the horizontal movement of the lifting platform 4, which is then unwanted and is automatically linked with a vertical movement, can be compensated for by a corresponding translational movement, which extends in the opposite direction, of the supporting carriage 3 along the supporting rails. For this purpose, the lifting device 1 possesses a measuring apparatus with the aid of which it is possible to generate an electrical signal which is representative of the vertical position of the lifting platform 4. For example, a transmitter may be provided, which measures the angular position of the pivoting member 24 in relation to the horizontal or to some other reference direction. The output signal from the measuring apparatus is now fed to the control system of the installation. This control system gives the driving motors for the supporting rollers 13 the signal to move the supporting carriage 3 in such a way that, when the lifting platform 4 is lowered, its location in the horizontal direction remains constant, and the lowering operation of said lifting platform 4 in space therefore takes place in a precisely vertical manner.

In a manufacturing installation, a number of lifting devices 1 generally follow one another on the supporting rails. If the lifting and lowering movements of the various lifting platforms 4 are controlled, in the manner described, by compensating movements of the corresponding supporting carriages 3 in such a way that they extend in a precisely perpendicular manner, this means that the distances between the lifting devices 1 that follow one another vary. This can be achieved in a particularly simple manner, if all the lifting devices 1 are equipped with their own drives for their horizontal movement. What can also be achieved in this case, for example, is that all the vehicle bodies 2 that follow one another are at the same distance from one another throughout, whereas the distances between the supporting carriages 3 from which the individual vehicle bodies 2 are suspended may be different at various points.

Basically, however, it is also possible for those supporting carriages 3 of the various lifting devices 1 which follow one another to be provided, in the installation as a whole, not with their own drives but with a common chain drive. This is particularly possible in those cases in which the lifting or lowering movement of the lifting platforms 4 does not need to take place in a precisely vertical manner or all the lifting and lowering movements take place simultaneously, so that that compensating movement of all the supporting carriages 3 which is necessary for achieving a precise vertical movement can take place simultaneously.

Figure 8:
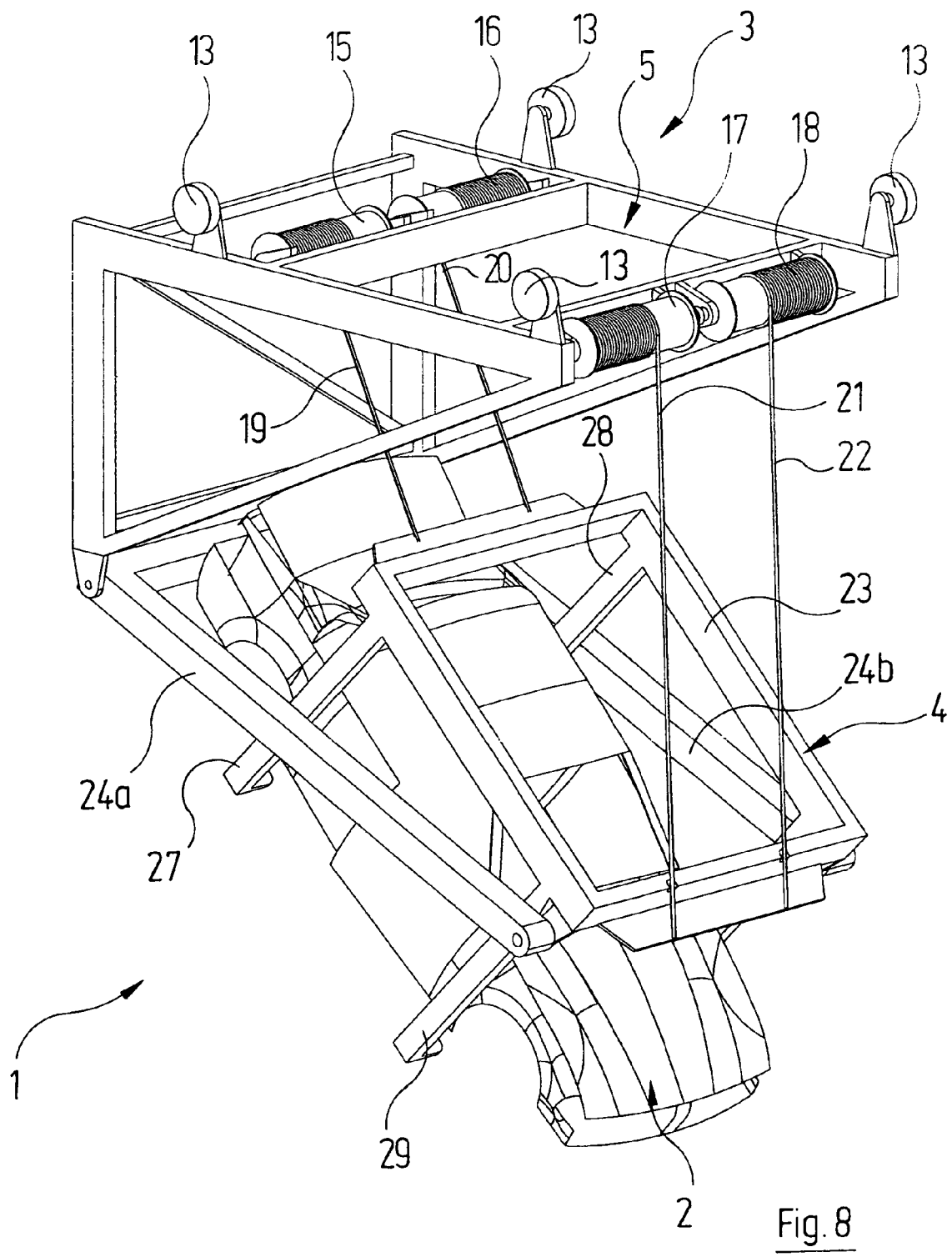
FIG. 8 shows the lifting device in FIGS. 1, 3 and 5, in which, however, the lifting platform is inclined in one direction.
Figure 9:
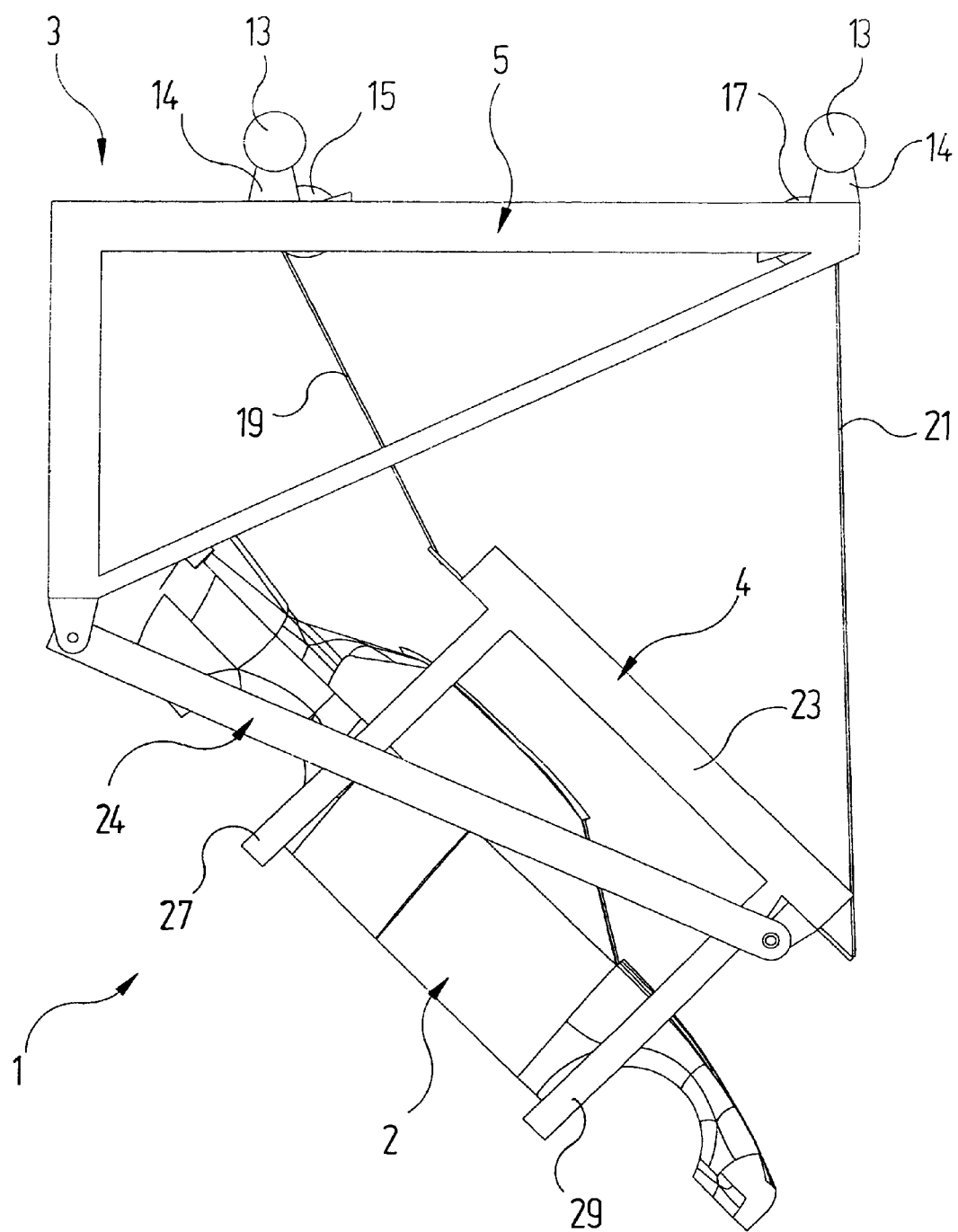
FIG. 9 shows the side view to FIG. 8.

With the aid of the lifting device 1 described above, it is not only possible to raise and lower the lifting platform 4 with the base frame 23 orientated horizontally, but what is more, said base frame 23 can also be tilted, in a manner superimposed upon the lifting or lowering movement, as is represented, for example, in FIGS. 8 and 9. In the latter, as a result of more extensive paying-out of the two cables 21, 22 adjacent to the front side of the vehicle body 2 and correspondingly less extensive paying-out of the cables 19, 20 adjacent to the rear of said vehicle body 2, the base frame 23 of the lifting platform 4 is tilted in such a way that the front side of said vehicle body 2 is inclined downwards. This may, for example, be a position which is particularly suitable for immersing the vehicle body 2 in an enamel tank or some other treatment liquid.

Figure 10:
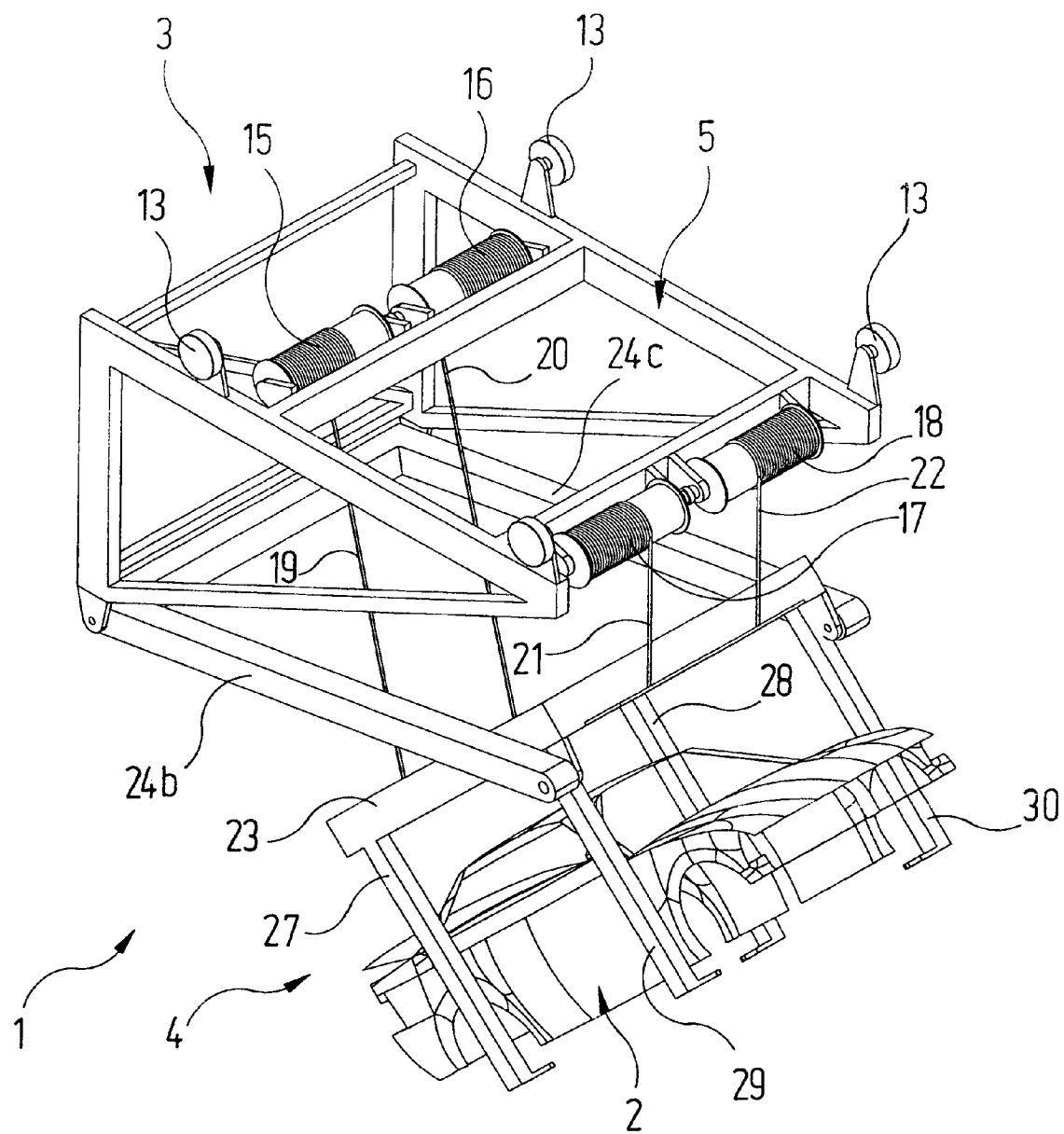
FIG. 10 shows the lifting device in FIG. 8, in which, however, the lifting platform is tilted in the opposite direction.
Figure 11:
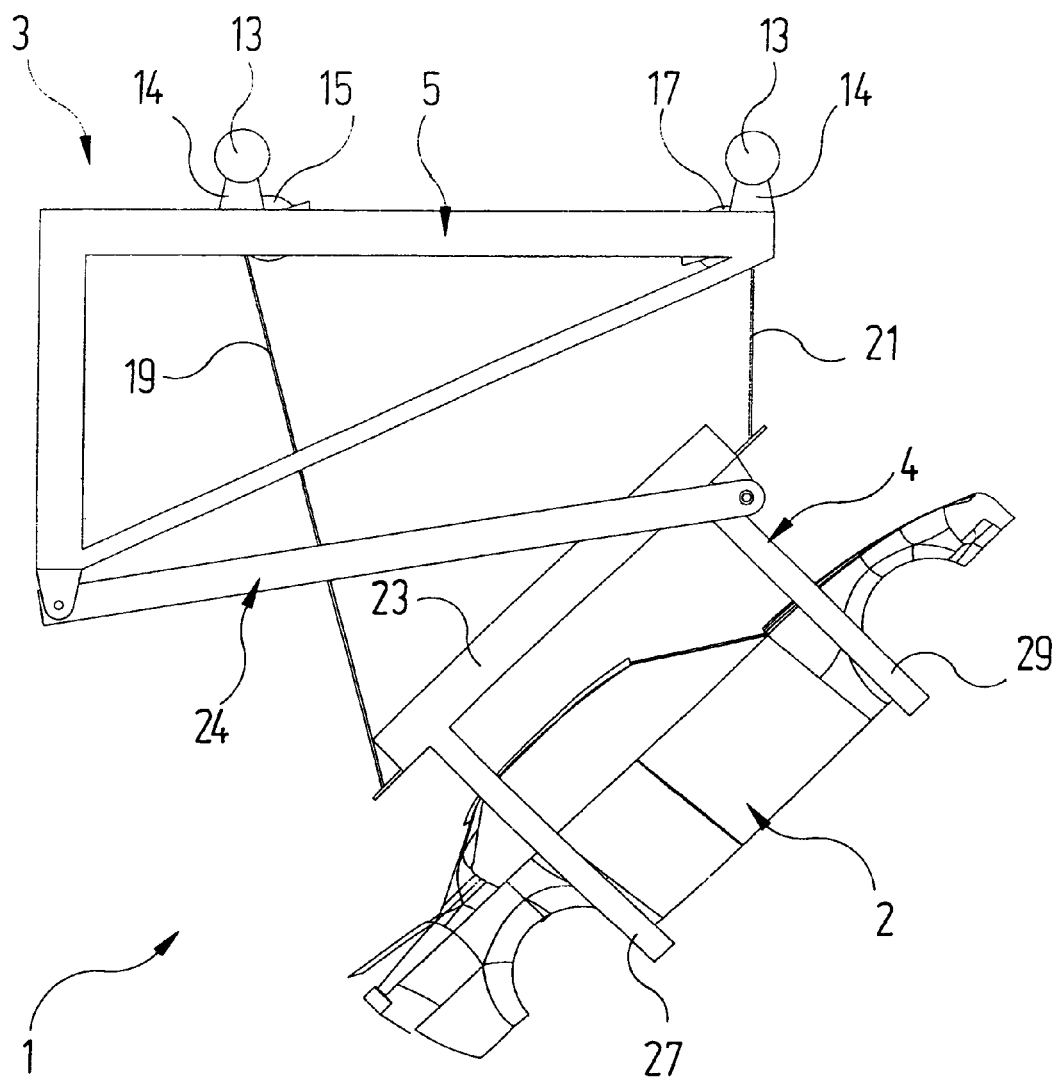
FIG. 11 shows the side view to FIG. 10.

FIGS. 10 and 11 show a reversed inclination of the base frame 23 of the lifting platform 4, in which the rear of the vehicle body 2 lies lower than the front side. This, too, may be a position which is favourable for the purposes of immersion in a treatment liquid.

In an exemplified embodiment which is not represented in the drawings, the lifting platform does not support the load directly but via a rotating device in which said load is held and which is rotatable or swivellable about an axis extending parallel to the direction of movement of the supporting carriage. It is thus possible, for example, to also rotate or swivel a vehicle about its longitudinal axis, something which is frequently desired, particularly during the final assembly of the vehicle.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:
1. Mobile lifting device comprising:
  a) a supporting carriage;
  b) a lifting platform for receiving a load;
  c) a hoisting apparatus connected to each of the supporting carriage and the lifting platform, including at least two traction members and, with the aid of which, the lifting platform can be moved with a vertical component of direction in relation to the supporting carriage;

d) a stabilising apparatus which prevents an uncontrolled lateral movement of the lifting platform in relation to the supporting carriage, e) wherein the stabilising apparatus is formed by at least one, essentially rigid pivoting member which is swivellably connected, in one end region, to the supporting carriage and, in an opposed end region, to the lifting platform in such a way that, when the supporting carriage is stationary, a movement of the platform that possesses a vertical component of direction is always linked with a defined horizontal movement of the platform.

2. Lifting device according to claim 1, wherein the lifting platform has an essentially rectangular base frame, and the at least two traction members comprises four traction members, wherein pairs of traction members are fastened on opposite, parallel sides of the rectangle.

3. Lifting device according to claim 2, wherein fastened to the base frame are a number of downwardly extending retaining struts to which a load can be detachably fastened.

4. Lifting device according to claim 1, wherein a control system is provided, to which a signal which is representative of the vertical position of the lifting platform is fed and which moves the supporting carriage horizontally, in accordance with the signal, in such a way that the horizontal movement which is linked with the vertical movement of the lifting platform is, at least partially, compensated for.

5. Lifting device according to claim 1, wherein the supporting carriage includes a drive for translational movement of the supporting carriage along a specific path.

6. Lifting device according to claim 1, wherein the supporting carriage is provided with coupling means by which the supporting carriage can be coupled to an external conveyer system for travelling of the supporting carriage along a specific path.

7. Lifting device according to claim 1, wherein the at least two traction members comprise a plurality of cables.

8. Lifting device according to claim 1, wherein the at least two traction members comprise chains.

* * * * *